(No Model.)

J. P. DAY.
METHOD OF AND APPARATUS FOR DISPENSING LIQUIDS.

No. 494,061. Patented Mar. 21, 1893.

Witnesses  Inventor
John Downie  James P. Day
Alfred T. Gage  By
  his Attorney

UNITED STATES PATENT OFFICE.

JAMES P. DAY, OF ANNISTON, ALABAMA.

METHOD OF AND APPARATUS FOR DISPENSING LIQUIDS.

SPECIFICATION forming part of Letters Patent No. 494,061, dated March 21, 1893.

Application filed February 2, 1892. Serial No. 420,079. (No model.)

*To all whom it may concern:*

Be it known that I, JAMES P. DAY, a citizen of the United States, residing at Anniston, in the county of Calhoun and State of Alabama, have invented certain new and useful Improvements in Methods of and Apparatus for Dispensing Liquids; and I do declare the following to be a full, clear, and exact description of the invention, such as will enable others skilled in the art to which it appertains to make and use the same, reference being had to the accompanying drawings, and to the figures of reference marked thereon, which form a part of this specification.

It is the purpose of my invention to provide a novel process and apparatus whereby ale, beer, and similar beverages which contain or are charged with an effervescing gas, such as carbonic acid gas, may be preserved from deterioration by the escape of said gas, said escape being due to the leakage or the withdrawal of the beer, as it is retailed, whereby an increasing space is formed in the keg, above the beer, and the interior pressure diminished thereby causing an escape and accumulation of the gas in the empty space.

It is my purpose to provide a simple and inexpensive process and apparatus whereby any beverage containing carbonic acid or other gas, may be kept in storage, retailed or used, without suffering material deterioration from the escape of such gas, and whereby the purchasers or consumers, of such beverages may be provided with a drink which shall be wholesome and agreeable whether it be taken from the original receptacle immediately after tapping the same, or from the last portions of its contents as preserved in my apparatus. It is my purpose also, to provide a novel process and apparatus whereby beverages containing or charged with volatile or effervescent gases, may be dispensed whether at wholesale or retail without suffering any substantial deterioration due to the loss of said gases.

My invention consists to these ends in the process or method, and in the apparatus for practicing the same, hereinafter fully described and then more particularly pointed out in the claims which conclude this specification.

To enable others skilled in the art to understand and practice my said invention and to make, construct and use my said apparatus, I will proceed to describe the same in detail, reference being had for such purpose to the accompanying drawings, in which I have shown a preferred form of apparatus for practicing said process, or method, but may be of any convenient form desired.

Figure 1:
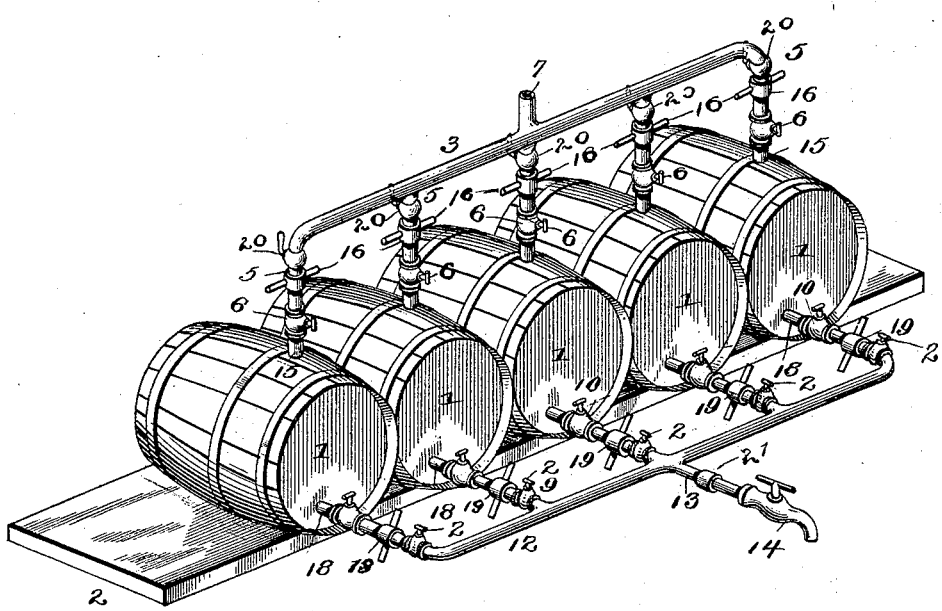
Figure 2:
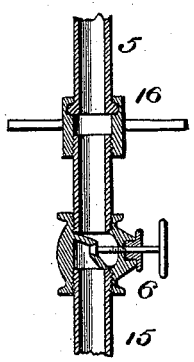
Figure 3:
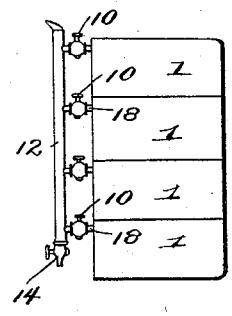

Figure 1 in said drawings is a perspective view of said apparatus. Fig. 2 is a detached sectional view on an enlarged scale illustrating one form of coupling and cocks. Fig. 3 is a modified form of connected vessels or receptacles placed one upon another.

The apparatus as illustrated is composed essentially of a series of receptacles each of which is indicated by the reference numeral 1. The receptacles are of substantially uniform size throughout the series and each is of comparatively small size, as regards the single receptacle, such as the cask or the keg, in which the beverage has heretofore been put up at the brewery or wholesale depot. Thus I replace this single receptacle by a series of smaller, separate receptacles, each capable of holding a fractional part of the entire contents of the keg or cask. I may use any number of these smaller receptacles, the size or capacity of which may be varied as circumstances may require. For example I may use four, five, or six of the vessels 1, to hold the contents of a single beer cask or keg, and in like manner this subdivision may be extended if desired, to a greater number of still smaller vessels; or on the other hand, the series may be diminished in number and the individual members correspondingly increased in capacity.

The reference numeral 3 indicates a pipe arranged in suitable proximity to the series of receptacles or vessels, its ends being bent to constitute branches 5 of said pipe 3 entering the receptacle 1 at the two extremities of the series. Each of the branch pipes 5 may have a stop-cock 20 so that any one of the vessels may be removed and the escape through the particular branch pipes be prevented, but these stop cocks may be omitted. Communicating with said pipe 3 at proper intervals, are other branch pipes 5, which enter the other vessels or receptacles 1, the flow through each of the branch pipes, of either fluid or air, being controlled by the cocks 6 of any suitable form. The pipe 7 has communication with the main pipe 3 preferably, though not necessarily, at its central point, and by this latter pipe the series may be filled with the beverage which the several vessels are designed to contain. The ends of the main pipe 3 and its branches 5 usually enter the receptacles or vessels through their tops, or upper sides, and if said vessels are of the form of diminutive casks, or kegs as shown in the drawings, the said filling pipes may enter through the bung holes.

Communicating with each receptacle or vessel 1 is a series of draw off tubes or eduction pipes 9, the flow therethrough being permitted and shut off by cocks 10. These pipes all have cocks 2, so that if any one receptacle be removed for cleansing and filling the pipe opposite thereto may be closed at the point of location of the cock, thereby preventing escape of contents of the other vessels at this point. All the pipes 9 have communication with the main pipe 12, and, with the latter preferably at its central point, a single pipe 13 has connection. This pipe 13 connects with or constitutes the tap and it is provided with any suitable form of faucet 14, the pipe being of any required length. Or it may be so constructed as to be coupled by a suitable coupling 21 to the ordinary bar or other fountain pipe through which the contents of the vessel 1 are drawn as they are served.

To promote the convenience of the brewer or the manufacturer as well as the retailer, I propose to provide each vessel 1 with a short permanently attached pipe or neck 15, to which the several branch pipes 5 may be coupled by unions 16. By placing the cocks 6 in the short pipes 15 and by swiveling the pipe unions upon the separate branch pipes 5 the whole series of vessels may be readily and quickly filled at the brewery or manufactory or by retailer, the cocks 6 closed and the branch pipes 5 uncoupled, after which the vessels are ready for sale or for delivery to the retailer. In like manner the receptacle or vessels 1 may be provided with short eduction pipes, or necks 18, to which the branch or draw off pipes 9 may be attached, the latter being provided with couplings or unions 19 similar to those in the branch pipes 5.

The above construction is not absolutely essential to the invention as direct connection with each vessel may be made by driving or screwing ordinary cocks or draft faucets directly into each vessel and then make connection by suitable couplings uniting with the branches from the main pipes if necessary. While it is preferred to have the eduction pipe of each vessel to connect with the main eduction pipe 12, still it is to be understood that a portion of my invention may be employed by omitting the main eduction pipe and drawing direct from each separate vessel whether for immediate consumption or for delivery into a separate vessel of smaller capacity from which to supply consumers. This is obvious, and when such method is employed the other parts of the invention as described will be used in the manner already described.

I have referred to the short pipes or necks being used for each receptacle and also couplings or unions being attached to the draw off pipes and have illustrated one form of such several parts but the invention is not limited to such forms as any old or well known form of faucet or cock and also of coupling may be employed and embraced within the scope of my invention. These short necks or faucets will in practice be as close as possible to the receptacle so as to offer the minimum of obstruction.

Under the arrangement specified any one or more of the vessels may be removed for the purpose of being cleansed or otherwise, and any one or more be filled as desired either simultaneously or in succession.

It is well known that in retailing beer or other beverages containing a gas, such as carbonic acid gas, the withdrawal of beer from casks leaves a constantly increasing space above the surface for the accumulation of the gas, which escapes in proportion to the diminution of the pressure within the keg. In this manner a considerable portion of the beer last withdrawn is liable to be flat or insipid.

I have ascertained that by subdividing the space usually inclosed by the ordinary cask, keg or other receptacle, within which the beverage is sold to the retailer, into a plurality of small or comparatively small closed vessels, by wholesaler or retailer, in the manner set forth, this difficulty may be in a great measure, if not almost entirely obviated. The subdivision of space effected by substituting a series of smaller vessels for a single large vessel avoids the formation of any considerable space above the surface of the beer in any one of said vessels, and as the latter are emptied consecutively there is, comparatively speaking but little variation in pressure and consequently very slight escape of the confined or absorbed gas.

My invention may be applied to the retailing of beverages other than beer, ale, &c., and is also applicable to the keeping of highly volatile fluids, such as gasoline, rhigoline, ether, &c. In these cases last mentioned the preferable construction will be a single container, subdivided by interior walls, or partitions as illustrated in Fig. 3 of the drawings. Under such construction each compartment or vessel is provided with an outlet pipe or neck 18, located at any desired point and provided with a valve 10 so that the contents of any one of the vessels or compartments can be drawn without disturbing any of the others. The several pipes or necks will communicate with the main pipe 12 through which the contents of any one vessel will pass after flowing through the outlet pipe or neck 18.

The main may be provided with a controlling valve 14. In filling the several vessels or compartments, the valve 14, will be closed and the valve 10 opened, and the fluid will be run into the main pipe 12, from whence it will pass through the necks 18 into the several compartments, after which the valves 10 will be closed and the main pipe 12 cleared by opening the valve 14 and then the apparatus is ready for withdrawing the fluid from any one of the compartments desired. The vessels, pipes and valves may be made of any material suitable for the particular use to be made of the vessels.

If desired the vessels instead of being made integral may be separate and still be arranged to operate as when made integral, or may be used separately.

It should be noted that I regard the single large container having a series of interior closed chambers as the full equivalent of the apparatus described, the separate vessels being preferred in the storing of beverages merely for the convenience of cleansing the same.

The receptacles will be provided with any known form of vent that will allow the receptacles to be filled but the same being well known and forming no part of this invention is not illustrated.

What I claim is—

1. The process or method herein described of preserving from deterioration fluids containing effervescing gas during the period of dispensing the same, the same consisting in drawing from only a portion of the main body of the fluid stored for use by dividing the body of the fluid containing the volatile gas into comparatively small volumes and storing the same in a series of separate closed vessels, or receptacles, each of a comparatively small size and cut off from communication with other vessels and drawing the fluid from any one of the series of vessels through a final discharge passage common to all of said separate small bodies of liquid as it is dispensed for consumption, substantially as described.

2. The apparatus described, the same consisting of a series of small or comparatively small closed vessels, or receptacles, each having a branch induction or filling pipe capable of communication with a common induction, and a separate branch eduction or draw-off pipe disconnected from the filling pipe, and a common eduction pipe having a single main pipe for all the receptacles, substantially as described.

3. An apparatus of the type substantially herein described for storing liquids consisting of a series of small or comparatively small, separate vessels, or receptacles, each having a short pipe, entering said vessel and provided with a cock, and a second short pipe also connnected thereto and having a cock, said short pipes each being provided with means for coupling and uncoupling with branch pipes for filling and for withdrawing the contents of said receptacles, respectively, substantially as described.

4. The combination with a series of small or comparatively small, closed vessels, or receptacles arranged upon a suitable support and provided with filling pipes, and draw off pipes, having suitable cocks, of a series of branch pipes, pipe unions adapted to connect said filling pipes and draw-off pipes, and branch pipes, said filling and draw off branch pipes communicating respectively with a common or main supply pipe, and a common draw-off pipe, substantially as described.

5. The combination of the series of vessels, or compartments of comparatively small size cut off from communication with one another and each provided with a valved pipe, and a common or main draw off pipe communicating with each of said valved pipes, substantially as described.

6. The combination with the series of vessels or compartments of comparatively small size and each provided with an inlet and an outlet pipe having a controlling valve, of a main supply pipe, means for detachably connecting it with each inlet pipe of the series of vessels and compartments, and a series of valves to said main supply pipe located to cut-off communication between said main supply pipe and any one or more of the inlet pipes to said compartments or vessels, substantially as and for the purposes described.

In testimony whereof I affix my signature in presence of two witnesses.

JAMES P. DAY.

Witnesses:
S. S. SENSABAUGH,
S. G. LAWRENCE.